United States Patent [19]
Ferrin

[11] 3,941,483
[45] Mar. 2, 1976

[54] TARGET IDENTIFICATION APPARATUS

[75] Inventor: Frank J. Ferrin, Wayzata, Hennepin, Minn.

[73] Assignee: Honeywell Inc., Minneapolis, Minn.

[22] Filed: Apr. 8, 1974

[21] Appl. No.: 458,602

[52] U.S. Cl............. 356/152; 250/203 R; 350/198; 356/5; 343/7.3
[51] Int. Cl.² ................... G01C 3/08; G02B 13/06
[58] Field of Search ............ 356/4, 5, 152; 350/298; 250/203 R; 343/7.3

[56] References Cited
UNITED STATES PATENTS

| | | | |
|---|---|---|---|
| 3,059,519 | 10/1962 | Stanton............................. | 350/145 |
| 3,205,303 | 9/1965 | Bradley.............................. | 350/298 |
| 3,402,630 | 9/1968 | Blau et al............................. | 356/5 |
| 3,723,005 | 3/1973 | Smith et al.......................... | 356/152 |
| 3,743,419 | 7/1973 | Skagerlund.......................... | 356/5 |
| 3,752,581 | 8/1973 | Everest et al.......................... | 356/5 |
| 3,802,780 | 4/1974 | Helm et al............................ | 356/152 |

Primary Examiner—Maynard R. Wilbur
Assistant Examiner—S. C. Buczinski

[57] ABSTRACT

Apparatus including discrimination circuitry for reliably identifying a target illuminated by a pulsed laser beam is disclosed. Laser energy received from objects within a field of view is imaged on one or more elements of an optical detector which produces electrical signals indicative of the direction of arrival of the laser energy. Signals from the detector are selectively passed to a display device by means of self-adaptive gating circuitry which blocks signals occuring during intervals when valid signals are not expected. Means for discriminating as to optical frequency, and for utilizing only the last returned reflection of each transmitted laser pulse is also disclosed for further increasing reliability.

10 Claims, 8 Drawing Figures

TARGET IDENTIFICATION APPARATUS

BACKGROUND OF THE INVENTION

The invention herein described pertains generally to electromagnetic energy detection, and more specifically to apparatus for sensing and displaying the direction of arrival of characterized electromagnetic energy. The invention has particular applicability to compact portable apparatus for reliably identifying a target illuminated by a pulsed laser beam.

Since the development of practical laser apparatus, such apparatus has taken a variety of forms and is used to perform a rapidly increasing number of functions. Continuing developments have led to the use of lasers in increasingly sophisticated, complex and compact apparatus. Laser energy is uniquely adapted to perform many heretofore impractical functions because of its coherent, extremely stable, single frequency characteristics, thus making possible the generation and transmission of very well defined and characterized beams of energy.

One of the practical present uses of a laser beam is to mark or identify a remote object or target. Since a very narrow laser beam can be produced and transmitted, marking or identification can be accomplished with very great resolution. Laser energy reflected from the target can then be detected by apparatus remote from both the transmitter and target, and used to reliably identify the target. Such a system can be used by pilots or other users in separate aircraft to provide means whereby those in one aircraft can accurately identify a ground target to persons in other aircraft.

One of the problems encountered in such applications is that objects between the transmitter and intended ground target, such as clouds and/or other airborne particles, may cause a partial reflection or dispersion of the laser beam. Laser energy arriving from such particles or objects may cause confusion and result in erroneous target identification. Thus, for maximum reliability it is necessary to provide means for discriminating between energy received from valid and invalid targets. In aircraft applications in which space and weight capacity is limited, and in which interference with and additional demands placed on an operator must be kept to a minimum, it is also necessary that the detection and display apparatus be compact, simple to operate, and cause minimum interference with other activities.

The detection and display apparatus of the applicant's invention fulfills the noted requirements by means of unique signal discrimination circuitry which provides for reliable discrimination between signals resulting from valid and invalid targets, and by utilizing signals corresponding to valid targets to produce an easily understandable target location display. The apparatus is self-contained and compact so that it may be conveniently carried on a user's person. The display may be in the form of a virtual image before the user's eye so as to provide minimum interference with his other visual activities.

SUMMARY OF THE INVENTION

The applicant's target identification apparatus basically comprises a direction sensitive detector for producing electrical signals in response to periodic electromagnetic pulse signals of known repetition rate and duration, gating means for passing the electrical signals from the detector only during windows defined by periodic gating signals, means for producing periodic gating signals having a duration greater than the duration of the electromagnetic pulses, and synchronization means for synchronizing the windows with electrical signals corresponding to electromagnetic pulses from valid targets. The electrical signals passed by the gating means are utilized to generate a display indicating the arrival direction of the electromagnetic pulses within the field of view of the detector.

The synchronization means may comprise clock means for producing periodic gating signals having substantially the same repetition rate as the electromagnetic pulses. Additional synchronization circuitry may be provided for varying the timing of the windows so that electrical signals corresponding to successive periodic electromagnetic pulses occur during the same portion of successive windows. An optical filter may be provided for passing electromagnetic pulse signals within only a specified band of optical frequencies, thereby discriminating against incoming signals of undesired frequencies. Last pulse logic may be included for rejecting all except the last returned reflection of each illuminating pulse, thereby discriminating against reflected pulses received from objects between the pulse source and the intended target.

Accordingly, it is a primary object of this invention to provide compact target acquisition apparatus for reliably identifying a target illuminated with pulsed electromagnetic energy.

It is a further object of this invention to provide directional laser energy detection apparatus having unique signal discrimination circuitry.

It is yet a further object to provide unique discrimination circuitry for periodic signals of known repetition rate and duration, wherein incoming signals are passed through gating means which defines periodic windows synchronized with the periodic signals.

It is yet a further object to provide signal discrimination circuitry for rejecting electrical signals corresponding to all except the last reflection of a pulse of electromagnetic energy transmitted toward a target.

It is another object to provide compact apparatus for detecting and displaying the direction of arrival of electromagnetic energy in a unique format wherein virtual directional indicators and a reticle are superimposed on a scene being viewed.

Additional objects of the present invention may be ascertained from a study of the disclosure, drawings and appended claims.

DESCRIPTION OF THE PREFERRED EMBODIMENT

Figure 1:
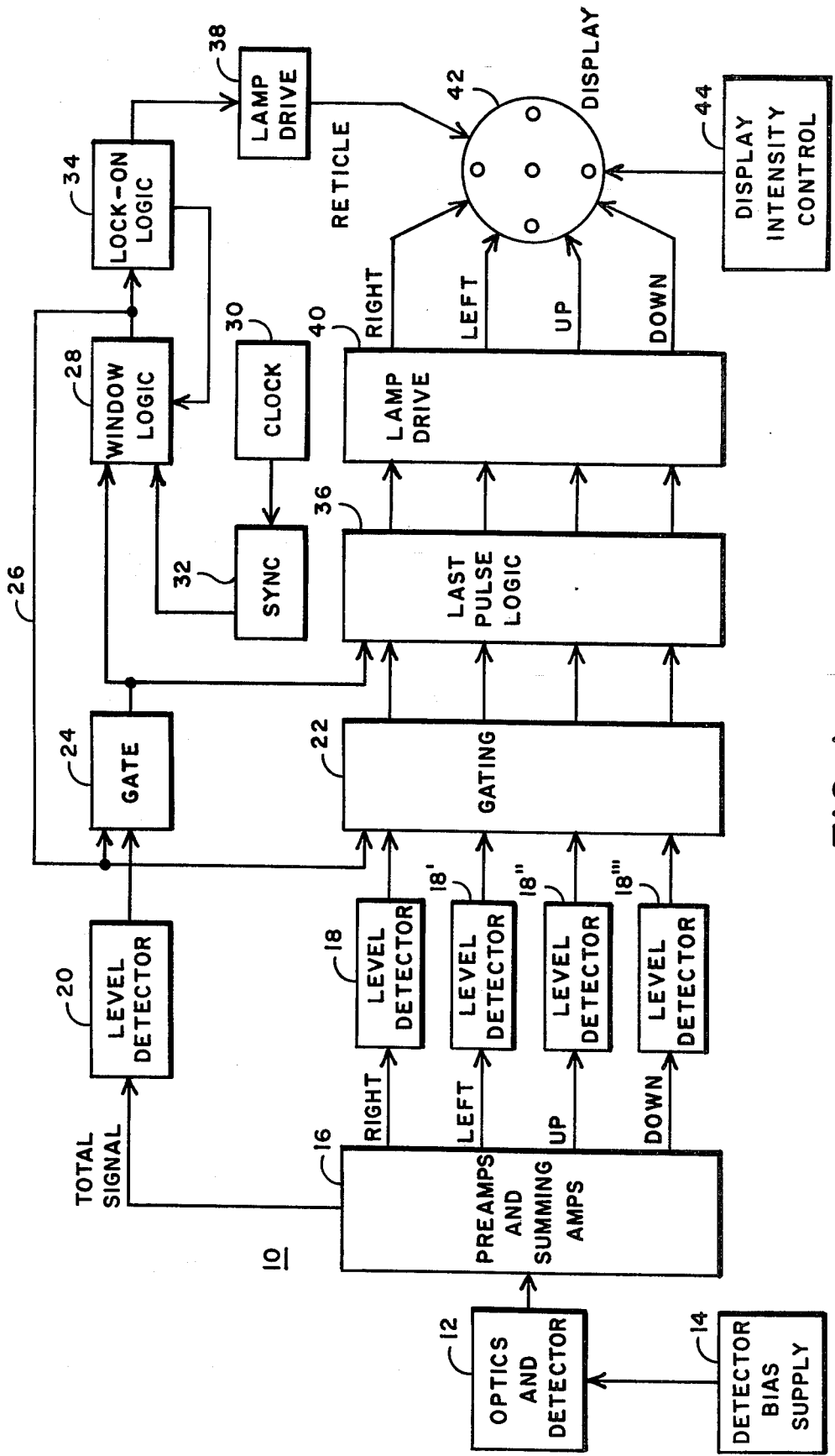
FIG. 1 is a block diagram of target acquisition apparatus including the applicant's unique signal discrimination circuitry.

FIG. 1 illustrates target acquisition apparatus according to the applicant's invention in generalized functional block diagram format. Several types of signal discrimination are utilized in combination to provide very reliable target identification. However, some of the types of signal discrimination are not necessary to the invention in its most basic form.

Figure 2:
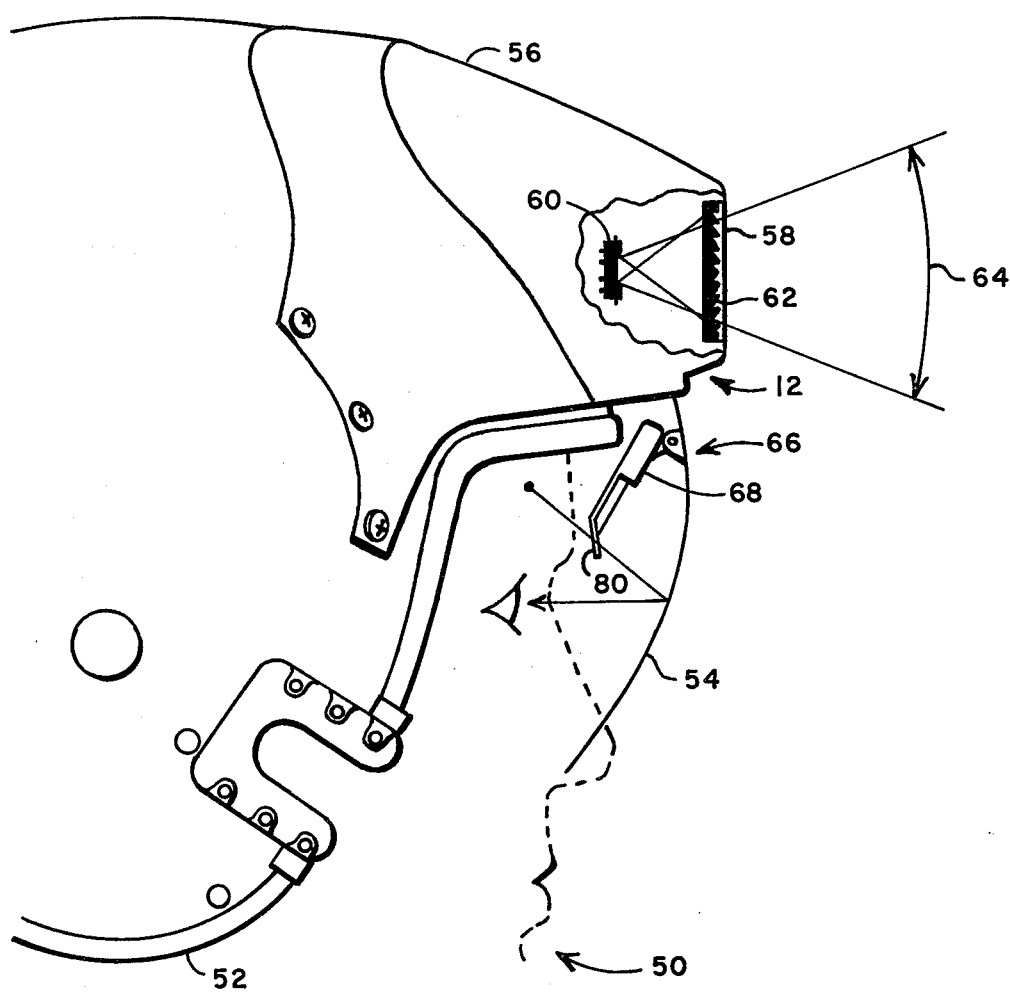
FIG. 2 is a pictorial representation of an embodiment of the applicant's invention intended for use by a pilot, showing optical detection apparatus employed therein.
Figure 7:
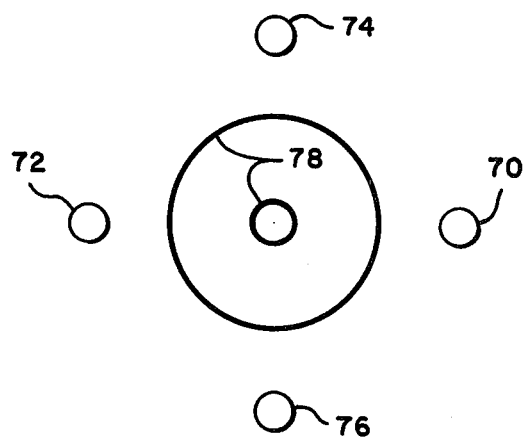
FIG. 7 is an illustration of the direction indicator and reticle image utilized in the apparatus shown in FIG. 1.

The invention can be embodied in a variety of geometrical configurations. One such configuration is shown in FIGS. 2 and 7 for illustrative purposes. The circuit constants and parameters disclosed in these figures and related description pertain to the same embodiment, and are likewise utilized solely for illustrative purposes. A variety of other external configurations and attendant variations in circuit parameters are within the scope of this invention.

In the block diagram of FIG. 1, reference numeral 10 generally identifies target acquisition apparatus in accordance with the applicant's invention. Apparatus 10 includes an optical detector 12 which has a predetermined field of view as more clearly shown in FIG. 2. As will be described more completely in connection with FIG. 2, optical detector 12 includes a narrow bandpass optical filter which rejects electromagnetic energy outside a narrow band of frequencies. The field of view accepted by the filter is imaged onto a detector having a plurality of discrete sensing elements. In a typical application, a target of interest is illuminated with a pulsed laser beam having an optical frequency which will be passed by the filter. If an illuminated target is within the field of view, its image will fall on the one or more of the sensing elements in the detector.

Several types of detectors are suitable for use in optical detector 12. However, for purposes of the following description, a detector comprising a plurality of light sensitive diodes will be assumed. The diodes are supplied with a suitable bias voltage by detector bias supply 14. A detector which has been found well suited for this application is a commercially available four quadrant detector. Each quadrant produces an electrical signal in response to electromagnetic energy imaged thereon. The electrical signals from optical detector 12 are supplied through suitable preamplifiers to a plurality of summing amplifiers. The preamplifiers and summing amplifiers are identified by reference number 16.

The summing amplifiers sum the signals from optical detector 12 so as to produce signals indicating that movement of the detector to the right, left, up or down is necessary to center the target in the field of view. These signals, identified in FIG. 1 as RIGHT, LEFT, UP and DOWN, are supplied to four level detectors identified by reference numerals 18 through 18'''. Summing amplifiers 16 also provide a separate signal to a level detector 20 any time a properly illuminated target is within the field of view. Level detectors 18 and 20 pass their input signals to gates 22 and 24 respectively only when the input signals exceed a predetermined magnitude.

Gates 22 and 24 are controlled by gating signals supplied on a conductor 26 from window logic 28 which will hereinafter be described in greater detail. Functionally, window logic 28 produces a gating signal only during the time pulsed laser energy reflected from an intended target is expected to arrive at optical detector 12.

Timing of the gating signals produced by window logic 28 is primarily controlled by a clock 30 which supplies a clock signal having the same repetition rate as the pulse rate of the laser beam. Clock 30 also supplies a higher frequency clock signal to synchronization circuitry 32 which adjusts the clock input to window logic 28 as necessary to keep the windows substantially centered around the arrival times of laser energy from a valid target. Window logic 28 is also under the control of lock-on logic 34 which produces a signal when it is determined that the windows are timed to pass energy from a valid target.

The signals from gates 22 are supplied to last pulse logic 36 which also receives an input from gate 24. Last pulse logic 36 functions to reject laser energy arriving from objects or particles between the laser transmitter and the intended target. The operation of last pulse logic 36 is based on the assumptions that the same number of reflected energy pulses will result from successively transmitted laser pulses, and that the last pulse (corresponding to the most distant object) in each of the groups of pulses probably represents the intended target. The signal from gate 24 is utilized to determine the last pulse. Passage of the proper number of pulses through gate 24 permits last pulse logic 36 to pass concurrent signals received from gates 22.

The signals from lock-on logic 34 and last pulse logic 36 are supplied to lamp drive circuits 38 and 40 respectively. Lamp drive circuits 38 and 40 convert short duration pulses into longer duration signals suitable for illuminating lamps employed in a display device 42 which will be described in greater detail in connection with FIG. 7. Briefly, lamp drive circuit 38 illuminates a reticle lamp any time lock-on logic 34 determines that gating signals from window logic 28 are timed to pass signal pulses from a valid target. Lamp drive 40 illuminates one or more right, left, up and down cuing lamps which indicate the direction the detector should be moved to center the intended target in the reticle. The intensity to which display 42 is illuminated is controlled by intensity control circuitry 44.

FIG. 2 illustrates the external configuration of target acquisition apparatus in accordance with the applicant's invention incorporated into a pilot's helmet. A pilot (or other observer) 50 is shown wearing a helmet 52 having a parabolic visor 54. In addition, helmet 52 has mounted thereon a housing 56 which supports an optical detector generally identified by reference numeral 12 corresponding to the optical detector of FIG. 1, and at least a portion of the circuitry shown in FIG. 1. As previously indicated, optical detector 12 includes a narrow bandpass optical filter 58, a multiple element detector 60, and a lens 62 for imaging a field of view designated by reference numeral 64 on detector 60. Lens 62 is shown as a Fresnel lens. Such a lens is quite satisfactory since image quality off the optical axis is not critical. However, a bulkier multielement lens could readily be substituted if desired.

A satisfactory embodiment of the present invention was produced for use with a target illuminated by a Nd:YAG laser designator pulsed at a 10 Hz rate. Optical filter 58 comprised an interference filter having a plurality of optical coatings so as to provide a narrow pass band centered on the laser frequency. Such filters are commercially available, the present filter having been obtained from Optical Coating Laboratories.

Lens 62 was designed with a focal length of 0.82 inch or an f number of approximately 0.6 to achieve a 30° field of view. It was desired to have a dead band of ±1.5° to simplify following logic circuitry. Therefore, the distance between lens 62 and detector 60 was set to defocus the image on detector 60 so that the laser energy would describe a well defined 0.020 inch diameter blur circle on the center of the detector.

Visor 54 carries a miniature display projector 66 including a housing 68 in which a plurality of miniature lamps and film for projecting the cuing indicators and reticle are mounted. A suitable display configuration is shown in FIG. 7 wherein RIGHT, LEFT, UP and DOWN cuing indicators are respectively identified by reference numerals 70, 72, 74 and 76. The reticle is identified by reference numeral 78. Projector 66 also includes a mirror 80 for projecting the display on visor 54. The display pattern is a collimated virtual image which appears to user 50 to be superimposed at infinity on the scene outside the visor.

Figure 3A:
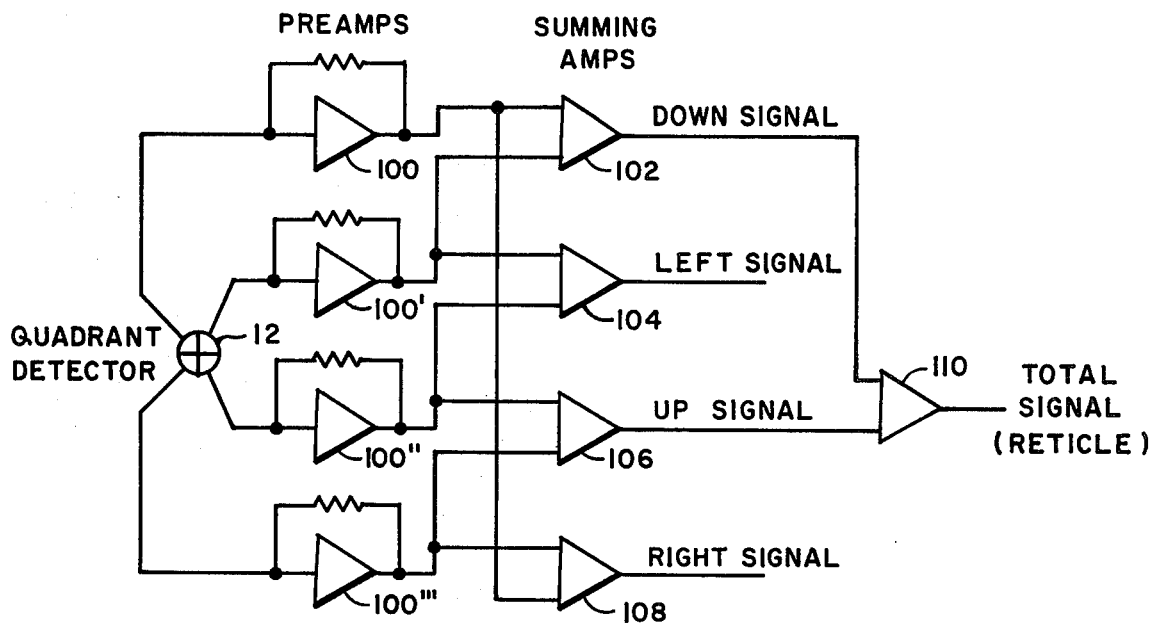
FIGS. 3A and 3B are schematic diagrams of the detector and preliminary signal processing and logic circuitry of the target acquisition apparatus shown in FIG. 1.

Circuitry for combining signals from the detector to produce UP, DOWN, RIGHT and Left cuing controls, as well as illuminating the reticle lamp is shown in FIG. 3A. The optical detector, identified by reference numeral 12 to correspond with the reference numerals in FIGS. 1 and 2, is shown as having four discrete quadrant sensors. Each of these sensors produces an electrical signal when laser energy is imaged thereon. Assuming that the quadrant detector is viewed from behind, imaging of the laser energy spot on the upper left quadrant indicates that the energy is coming from the observer's lower right. This will illuminate the DOWN and RIGHT cuing lamps as follows. Each of the quadrant sensors is connected to a preamplifier identified by reference numeral 100 through 100'''.

The outputs of preamplifiers 100 are connected to the inputs of four summing amplifiers 102, 104, 106 and 108, each having two inputs. Specifically, the output of amplifier 100 is connected to one input of summing amplifiers 102 and 108. The output of amplifier 100' is connected to one input of amplifiers 102 and 104. The output of amplifier 100'' is connected to one input of summing amplifiers 104 and 106. The output of amplifier 100''' is connected to one input of summing amplifiers 106 and 108. An electrical signal supplied to either of the inputs of any summing amplifier results in an electrical signal at its output. Thus, imaging of laser energy on the upper left quadrant sensor results in an electrical signal at the inputs of summing amplifiers 102 and 108, which produce a DOWN signal and a RIGHT signal, indicating that the observer should move his line of sight toward the down-right direction until the cuing lamps extinguish. This indicates that the observer is looking directly at the illuminated target through the sighting reticle.

If the laser energy spot is imaged on the division between two quadrants, e.g., between the upper two quadrants, then both the RIGHT and LEFT signals will appear. Logic, which will be described hereinafter, prohibits either the right or left cuing lamp from being illuminated thereby indicating that the laser spot is centered in the right/left direction.

An additional summing amplifier identified by reference numeral 110 receives signals from amplifiers 102 and 106, and produces a signal any time laser energy is being received. Summing amplifiers 102 and 106 produce signals when laser energy is imaged on the upper and lower halves of the detector respectively. Thus, one of these summing amplifiers, and consequently amplifier 110, produces a signal at any time a properly illuminated target is within the field of view of the optical detector. The signal produced by amplifier 110 is of relatively constant magnitude, and comprises the input for synchronization circuitry 32 and lock-on logic 34 as will be described hereinafter.

Figure 3B:
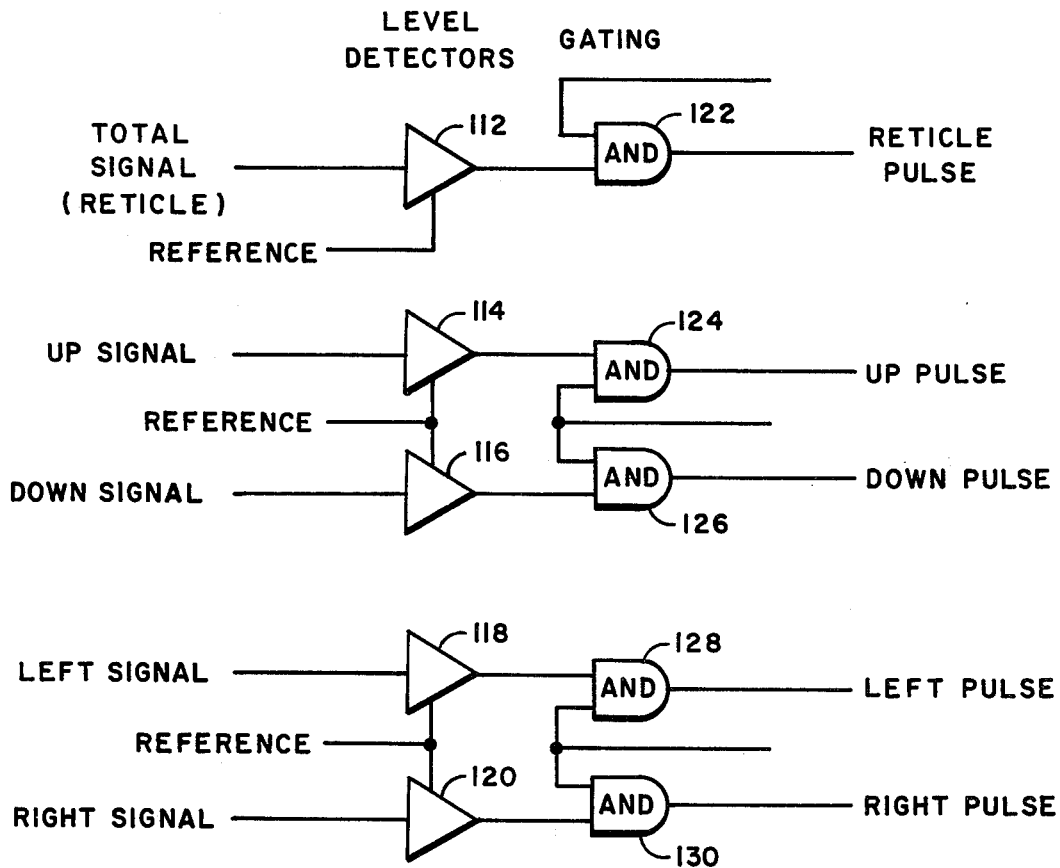

The DOWN, LEFT, UP, RIGHT and TOTAL (or RETICLE) signals produced by the circuitry of FIG. 3A are supplied to level detectors and gating circuitry shown in FIG. 3B. The RETICLE signal is supplied to a level detector 112. the UP, DOWN, LEFT and RIGHT signals are supplied to level detectors 114, 116, 118 and 120 respectively. Level detectors 112-120 are also supplied with reference signals which establish the minimum levels of the RETICLE, UP, DOWN, LEFT and RIGHT signals required for passage to the gating circuitry.

The gating circuitry comprises a plurality of AND elements 122-130 each having one input connected to the output of one of level detectors 112-120. The second inputs of AND elements 122-130 are supplied with the window signal from window logic 28 as shown in FIG. 1. As previously indicated, the gating circuitry passes the signals supplied thereto by level detectors 112-120 only when receiving a gating signal from window logic 28.

Figure 4:
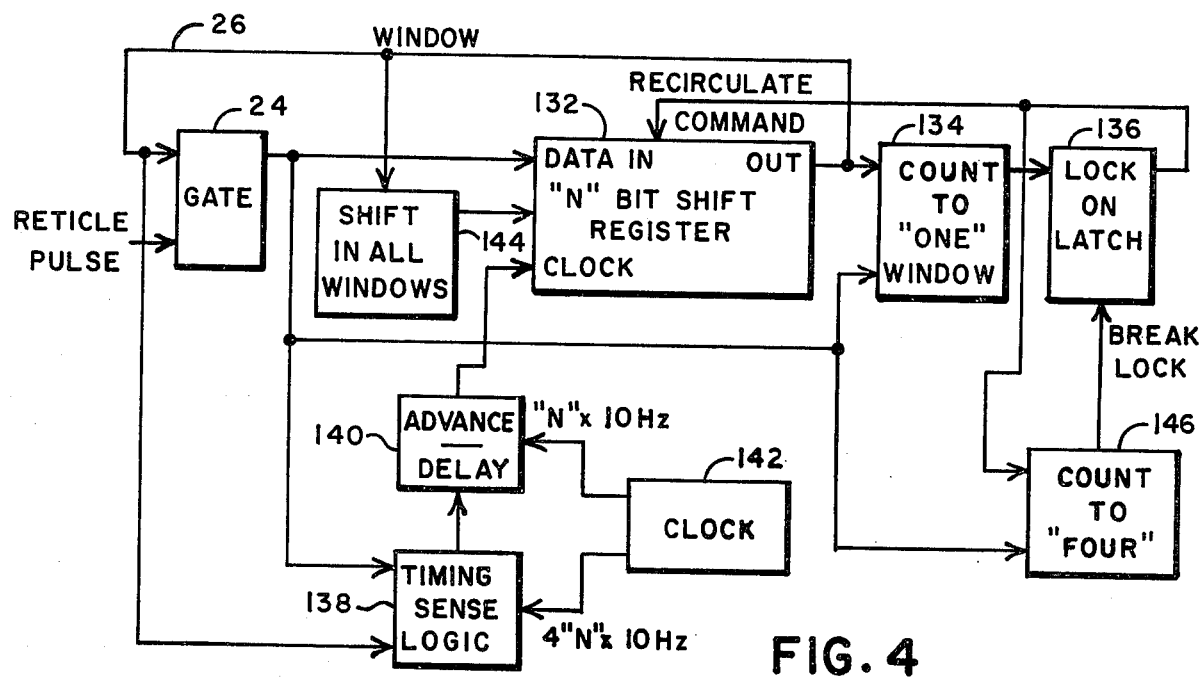
FIG. 4 is a schematic diagram of the gating logic of the target acquisition apparatus shown in FIG. 1.

The window logic, lock-on logic and synchronization means comprising elements 28-32 in FIG. 1 are shown in greater detail in FIG. 4. Reticle pulse signals are supplied to a gate identified by reference numeral 24 to correspond to the reference numeral used in FIG. 1. Gate 24 also receives a gating signal on conductor 26. If the reticle pulse occurs during a gating signal, it is passed through the gate, extended to the duration of the gating signal by a latch (not shown), and supplied to the data input of an N bit shift register 132. The extended reticle pulse is advanced through shift register 132 at a rate determined by clock and synchronization circuitry to be described. As the extended reticle pulse is shifted out of the shift register, it forms the gating signal for gate 24. The number of bits in shift register 132 and the clock rate are chosen so that the shift register cycle time is equal to the time required for a complete cycle of the transmitted laser pulse. Accordingly, once the window is locked onto a signal resulting from laser energy returned from a valid target, shift register 132 will provide one window for each complete shift register cycle.

The output of shift register 132 is supplied to a resetable counter 134 labelled as a "count to "one" window". Counter 134 also receives the output signal of gate 24. If the window is locked onto the reticle signals, counter 134 is alternately caused to count to one by the output of shift register 132 and then reset by the output of gate 24. Such operation of counter 134 causes a lock-on latch identified by reference numeral 136 to internally recirculate the windows through shift register 132. Since the cycle time of the shift register corresponds to the repetition rate of reticle signals, the windows are substantially synchronized with the signals.

However, because the clock in the target acquisition apparatus is not slaved to the clock controlling the laser source, slight variations in the two clock frequencies may eventually cause loss of synchronization. Compensation for such loss of synchronization is provided by means of timing sense logic 138 and advance-delay logic 140. Both timing sense logic 138 and advance-delay logic 140 receive clock input signals from a clock 142. Clock 142 supplies a clock signal at N times the laser repetition rate to advance-delay logic 140 which, in turn, supplies substantially the same frequency to the clock input of shift register 132. The frequency may, however, be varied by an input from timing sense logic 138.

Timing sense logic 138 receives a window or gating signal at one input. This signal is divided into four portions by means of logic circuitry supplied with a clock signal at 4N times the 10 Hz laser pulse rate. Timing sense logic 138 also receives the reticle pulses which are transmitted through gate 24. If the reticle pulses occur during the second or third portions of the gating or window signal, no correction of the basic clock signal is required. However, if the reticle pulse occurs during the first portion of the window signal, timing sense logic 138 provides a signal to advance-delay logic 140 which delays the next basic clock pulse by one half cycle. Thus, the window is shifted so that the reticle pulse occurs during the third portion of the window. Similarly, if the reticle pulse occurs during the fourth portion of the window, timing sense logic 138 supplies a signal to advance-delay logic 140 which advances the basic clock frequency by one half cycle, thus shifting the window so that reticle pulses occur during the second portion thereof.

It will be noted that special provisions must be made for initially locking the window onto the reticle signals. This is accomplished by means of a one shot multivibrator having a time constant slightly greater than the cycle time of shift register 132. The multivibrator and an inverter associated therewith designated as "shift in all windows" are identified by reference numeral 144. The multivibrator is triggered by a window signal from the output of shift register 132. The inverter causes the output of the multivibrator to remain low for an interval following each window signal shifted out of shift register 132. However, if no window signal is produced during a shift register cycle, the multivibrator is not triggered and its output becomes high. This causes shift register 132 to be filled with windows, one of which will correspond to a reticle pulse, thus permitting lock-on to be established.

It is possible that a reticle pulse will fail to be produced because of a momentary obstruction in front of optical detector 12 or for some other reason. However, it is assumed that if more than four reticle pulses are missing, laser energy is not present within the detector field of view. It is then necessary to interrupt shifting of windows through shift register 132. This is accomplished by means of a resetable counter 146 designated as "count to "four"". Counter 146 counts window signals circulated through lock-on latch 136 and is reset by reticle pulses transmitted through gate 24. Normally counter 144 is reset after each window. However, if four reticle pulses are missing, counter 144 supplies a signal to lock-on latch 136 which interrupts recirculation of window signals through shift register 132.

Figure 5:
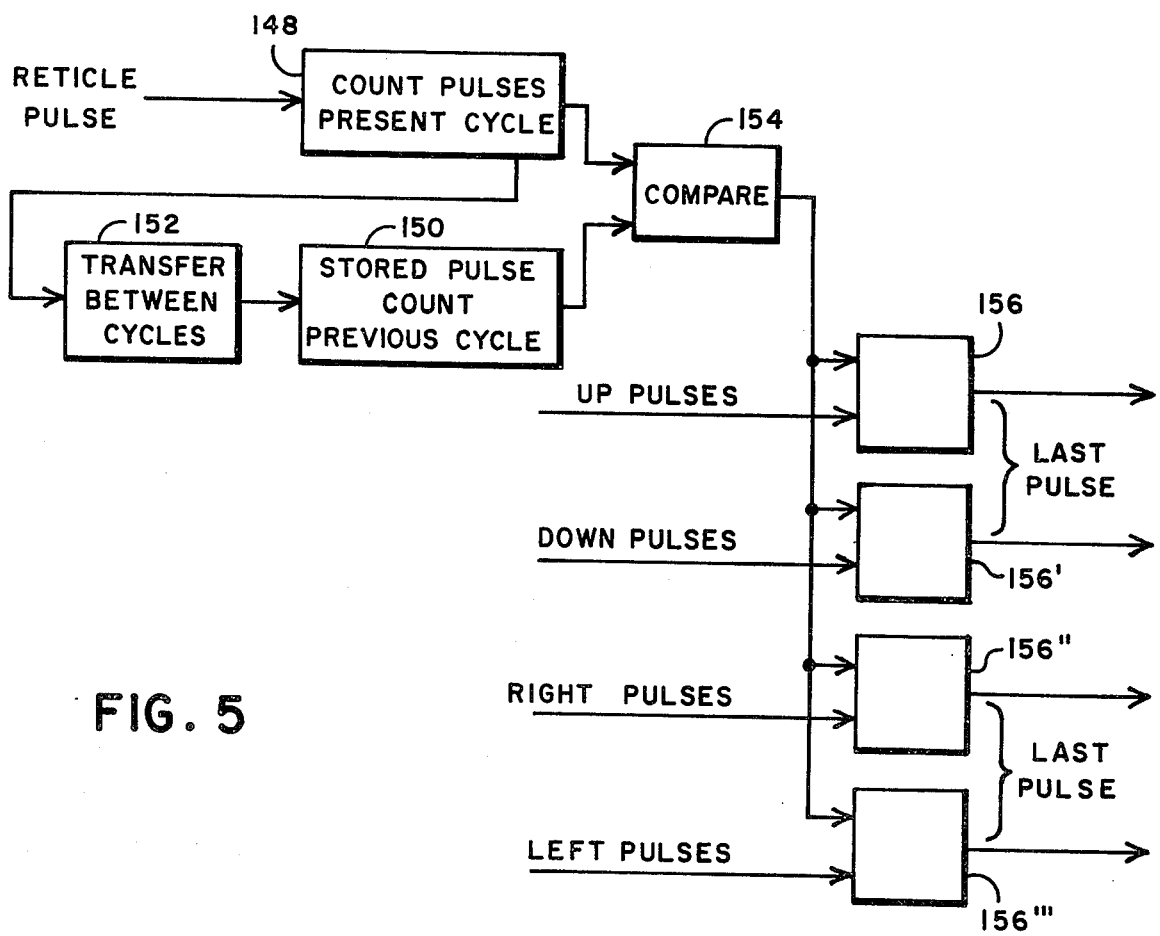
FIG. 5 is a schematic diagram of the last pulse logic of the apparatus shown in FIG. 1.

Each single laser pulse may result in reflections from objects or particles in addition to the intended target. Optical detector 12 will respond to these reflections by producing a series of closely spaced pulses. A group of pulses will occur during an interval shorter than the duration of a window, and will thus be passed through the gating circuitry. It is assumed that the intended target will be the one most distant from the laser source and/or target acquisition apparatus. Thus, the last pulse in each group of pulses will correspond to the intended target. FIG. 5 illustrates circuitry for rejecting all except the last pulse in each group of pulses so as to provide reliable target identification.

The reticle pulse from gate 24 is supplied to a counter 148 which counts the number of pulses resulting from each repetition of the pulsed laser beam. After each repetition, the count in counter 148 is transferred to a storage register 150 by means of transfer circuitry 152. During each repetition the count accumulating in counter 148 is also compared with the count stored in storage register 150 by means of comparison circuitry 154. When the number of pulses in the present repetition equals the stored count, comparision circuitry 154 provides a gating signal to gates 156 through 156'''. Gates 156 receive UP, DOWN, RIGHT and LEFT pulses from the gating circuitry shown in greater detail in FIG. 3B. Accordingly, UP, DOWN, RIGHT or LEFT pulses occuring during a gating signal supplied by comparison circuitry 154 are passed through gates 156. Such pulses comprise the last pulses in the groups of pulses transmitted through the gating circuitry.

Figure 6:
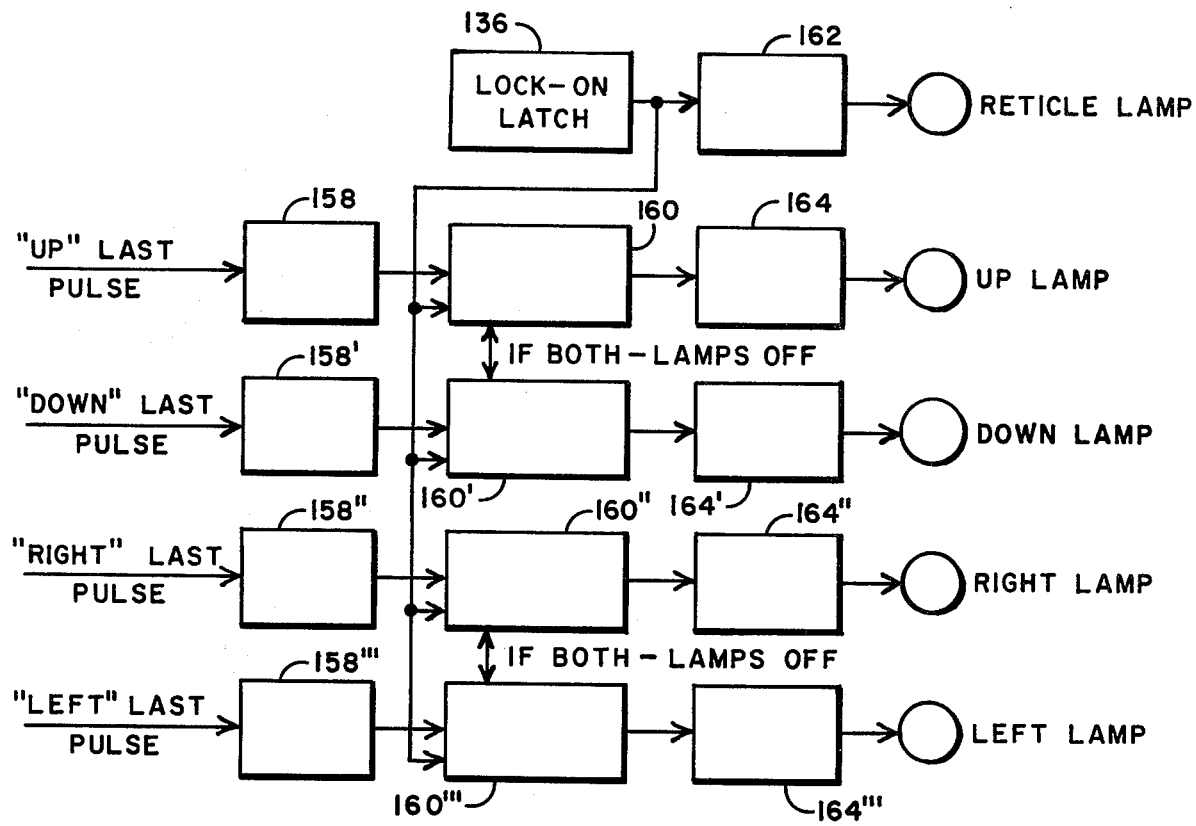
FIG. 6 is a schematic diagram of the lamp drive circuitry of the apparatus shown in FIG. 1.

Signals supplied by the last pulse logic are used to control four cuing lamps. The signals are supplied to latches 158 through 158''' as shown in FIG. 6. The outputs of the latches are supplied to holding registers 160 through 160''' which are used to eliminate undesirable flicker of the lamps which would otherwise result from the relatively low frequency 10 Hz signals. Holding registers 160 are also supplied with a signal from lock-on latch 136 so as to prevent illumination of cuing lamps when the windows are not locked onto the reticle signal. The signal from lock-on latch 136 is used to control a lamp driver 162 for driving the reticle lamp which illuminates reticle 78 shown in FIG. 7. The outputs of holding registers 160 are supplied to lamp drivers 164 through 164''' which respectively drive UP, DOWN, RIGHT and LEFT cuing lamps identified by reference numerals 74, 76, 70 and 72 respectively in FIG. 7.

Although a specific embodiment of target acquisition apparatus for reliably identifying a target illuminated by a pulsed laser beam is shown for illustrative purposes, other embodiments which do not depart from the applicant's contemplation and teaching will be apparent to those skilled in the art. The applicant does not intend that coverage be limited to the disclosed embodiment, but only by the terms of the appended claims.

What is claimed is:

1. In target acquisition apparatus of the type having a direction sensitive detector for producing electrical signals in response to periodic electromagnetic pulse signals of known repetition rate and duration arriving from a target within a field of view and indicator means for providing an indication when the detector is directed so that the target is located within a predetermined area of the field of view, improved discrimination circuitry comprising:
gating means for passing the electrical signals from said direction sensitive detector to said indicator means only during windows defined by periodic gating signals;
clock means for producing periodic gating signals having substantially the same repetition rate as the electromagnetic pulses and each having a duration greater than the duration of the electromagnetic pulses;

means for supplying the gating signals from said clock means to said gating means; and synchronization circuitry for varying the time of occurrence of said windows so that the electrical signals corresponding to the electromagnetic pulses occur during a specified portion of the windows.

2. The apparatus of claim 1 wherein said direction sensitive detector includes an optical filter for rejecting electromagnetic pulses having frequencies outside of a predetermined frequency band.

3. The apparatus of claim 1 further including level sensitive means connecting said direction sensitive detector to said gating means, said level sensitive means passing only electrical signals which exceed a predetermined magnitude.

4. The apparatus of claim 1 further including means for interrupting said windows defined by periodic gating signals if electrical signals corresponding to more than four consecutive periodic electromagnetic pulsee signals are missing.

5. The apparatus of claim 1 further including display means comprising a transparent parabolic screen through which the target is viewed and projection means for projecting a collimated reticle and cuing indicator onto said screen from a line passing through the focal point of said screen.

6. Target acquisition apparatus for identifying a target illuminated by a pulsed laser beam having a known optical frequency, pulse duration and pulse repetition rate comprising:

a direction sensitive detector for producing electrical signals in response to energy at said optical frequency reflected from objects within a field of view;

level sensitive means for passing only electrical signals above a specified level;

means connecting said level sensitive means to said direction sensitive detector;

gating means for passing electrical signals only in response to gating signals;

means connecting said gating means to said level sensitive means;

gating control means for producing gating signals defining periodic windows having a duration greater than the pulse duration of the laser beam, a repetition rate substantially equal to the repetition rate of the laser beam, and being timed so as to occur during a predetermined portion of each complete pulse repetition interval;

means for supplying the gating signals from said gating control means to said gating means;

indicator means for producing a display indicative of the target position within said field of view in response to the electrical display signals;

transfer means connecting said gating means to said indicator means, said transfer means providing at least a portion of the electrical signals from said gating means as the electrical display signals.

7. The apparatus of claim 6 wherein said gating control means includes means for varying the timing of said windows so that the reflections of successive laser beam pulses occur during corresponding portions of successive windows.

8. The apparatus of claim 7 wherein said gating control means comprises a clock for supplying signals having substantially the same repetition rate as said pulsed laser beam, timing sense logic for producing a signal indicative of the timing of the laser beam pulses relative to said windows, and means for varying the timing of said windows in response to the signal from said timing sense logic.

9. The apparatus of claim 8 further including last pulse logic for passing only the last of a series of signal pulses resulting from each laser beam pulse.

10. The apparatus of claim 9 wherein said indicator means comprises a transparent parabolic screen through which the target is viewed and a projector for projecting a collimated reticle and cuing lamp pattern onto said screen along a line passing through the focal point of said screen.

* * * * *